United States Patent [19]
Botwin et al.

[11] 3,728,727
[45] Apr. 17, 1973

[54] PHASE INTERFEROMETER RADAR

[75] Inventors: Leo Botwin, Westport; Lawrence Chanzit, Stamford, both of Conn.; Kenneth A. Ruttenberg, Peabody, Mass.

[73] Assignee: United Aircraft Corporation, Hartford, Conn.

[22] Filed: Mar. 13, 1970

[21] Appl. No.: 19,332

[52] U.S. Cl. ................................................343/16 R
[51] Int. Cl. ........................................................G01s 9/02
[58] Field of Search .....................................343/16 R

[56] References Cited

UNITED STATES PATENTS 3,438,033  4/1969  Preston ............................343/16 R
3,490,018  1/1970  Botwin et al. ...................343/16 R Primary Examiner—T. H. Tubbesing
Attorney—Melvin Pearson Williams

[57] ABSTRACT

An improved phase interferometer radar provides a high-sensitivity output in accordance with the elevation angle of terrain as a function of range. The transmitted frequency is cyclically varied to produce corresponding variations in the apparent elevation angles. A plurality of synchronous detectors are employed which respond to such cyclic variations and provide a low-sensitivity signal indicating the elevation angle of terrain as a function of range. The high-sensitivity signal exhibits a plurality of ambiguities which are eliminated by employing the low-sensitivity signal to control the gating of the high-sensitivity signal to a display device.

17 Claims, 1 Drawing Figure

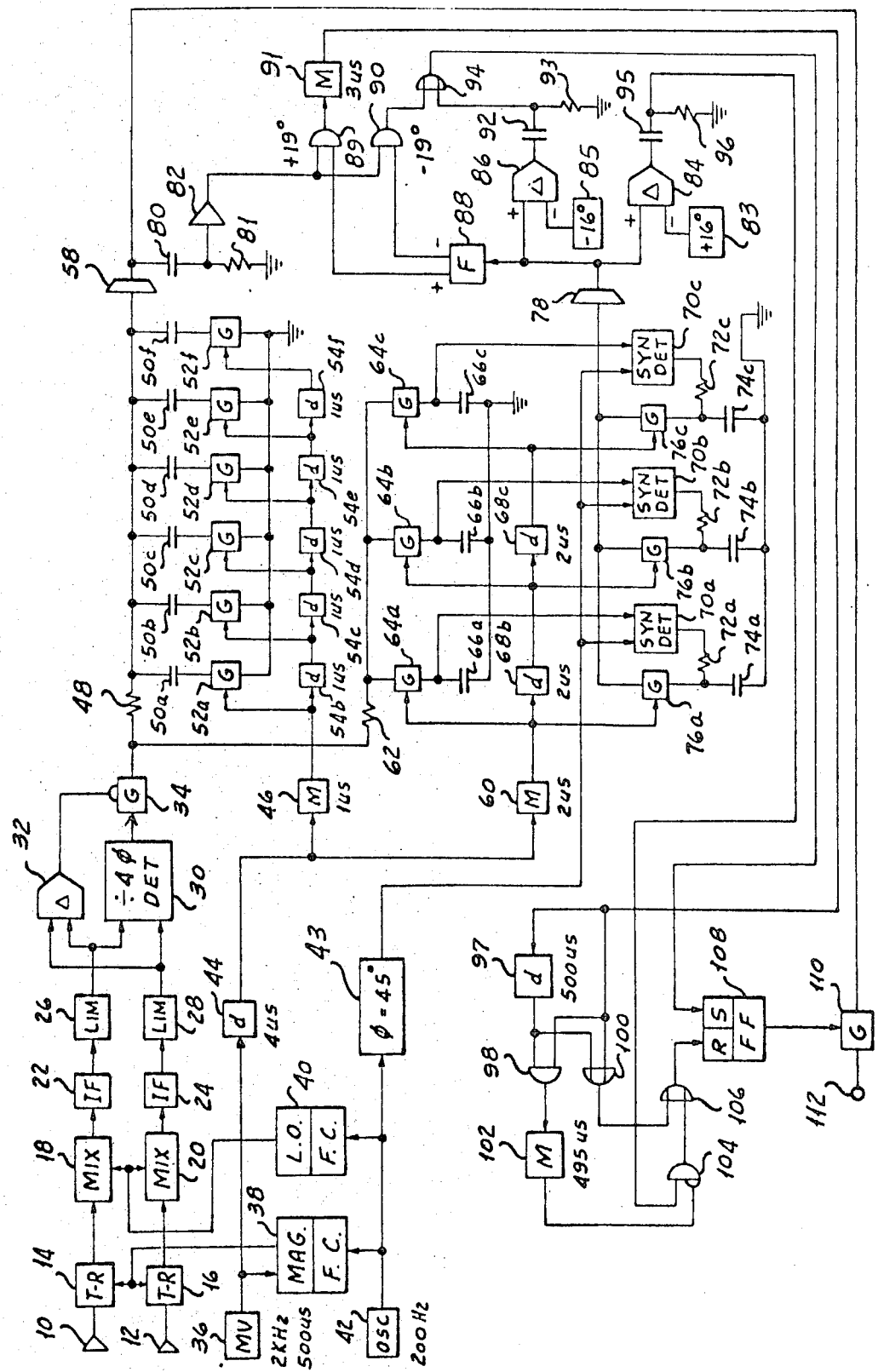

3,728,727

PHASE INTERFEROMETER RADAR

BACKGROUND OF THE INVENTION

This application is an improvement over the application of Botwin et al. for Phase Interferometer Ambiguity Resolution System filed July 24, 1967, Ser. No. 655,642, now U.S. Pat. No. 3,490,018. In the co-pending application, the two phase flips which define the three ambiguous regions of the high-sensitivity signal are used to control a single range-gated filter which operates a single synchronous detector. The polarity of the output of the synchronous detector indicates which of the two phase flips is being tracked.

SUMMARY OF THE INVENTION

One object of our invention is to provide an improved phase interferometer radar in which the central region of the high-sensitivity elevation angle versus range signal may be tracked without the necessity for utilizing the phase flips which may or may not occur at the end points of the region.

Another object of our invention is to provide an improved phase interferometer radar which eliminates ambiguities in the high-sensitivity signal.

A further object of our invention is to provide a frequency-agile phase interferometer radar employing a plurality of synchronous detectors for providing a low-sensitivity elevation angle versus range signal.

A still further object of our invention is to use the low-sensitivity signal to control the gating of the high-sensitivity signal to a display device.

Other and further objects of our invention will appear from the following description.

BRIEF DESCRIPTION OF THE DRAWING

The accompanying drawing which forms part of the instant specification and is to be read in conjunction therewith is a schematic view illustrating a preferred embodiment of our invention.

DESCRIPTION OF THE PREFERRED EMBODIMENT

Referring now more particularly to the drawing, a pair of vertically spaced horns 10 and 12 are coupled to respective transmit-receive devices 14 and 16. Devices 14 and 16 are driven by a magnetron 38, and apply received terrain signals to mixers 18 and 20 which are supplied by a local oscillator 40. The outputs of mixers 18 and 20 are coupled through respective intermediate-frequency amplifiers 22 and 24 and limiters 26 and 28 to a divide-by-four phase detector 30, the construction of which is shown in the aforementioned co-pending application. The outputs of limiters 26 and 28 are coupled to a differential amplifier 32. A multivibrator 36 provides output pulses of 0.1 microsecond duration at a 2KHz rate and thus with a period of 500 $\mu$s between pulses. A 200 Hz oscillator 42 is coupled to the frequency control inputs of magnetron 38 and local oscillator 40. The frequency changes produced by oscillator 42 in components 38 and 40 are the same, so that the outputs of mixers 18 and 20 are of constant frequency.

The output of phase detector 30 is coupled to a gate 34. The output of differential amplifier 32 is coupled to an inhibiting input of gate 34. The output of gate 34 is coupled through an input resistor 48 to the input of a buffer amplifier 58, which provides a high-sensitivity but ambiguous output signal. The input of buffer amplifier 58 is coupled to a plurality of range-gated comb filtering capacitors 50a through 50f which are sequentially grounded through gates 52a through 52f. The output of multivibrator 36 is connected to a network 44 which provides a time delay of 4 us corresponding to the recovery time of transmit-receive tubes 14 and 16. The output of network 44 triggers a monostable multivibrator 46 which provides an output pulse of 1 us duration. The output of multivibrator 46 enables gate 52a and is applied to a 1 us delay network 54b. The output of network 54b enables gate 52b and drives a 1 us delay network 54c. The output of network 54c enables gate 52c and drives a 1 us delay network 54d. The output of network 54d enables gate 52d and drives a 1 us delay network 54e. The output of network 54e enables gate 52e and is applied to a 1 us delay network 54f which enables gate 52f.

In practice with a period of 500 $\mu$s between transmitted pulses, there are provided some 495 capacitors 50, gates 52, and delay networks 54 to produce a corresponding number of 1 $\mu$s range-gated intervals. The time-constant of resistor 48 and any one of the identical capacitors 50 may be 10 $\mu$s to integrate over ten pulses and thence one cycle of oscillator 42.

The output of delay network 44 is also coupled to a monostable multivibrator 60 which provides an output pulse of 2 $\mu$s duration. The output of gate 34 is connected to one terminal of an input resistor 62 of a second range-gated comb filter. The other terminal of resistor 62 is connected through a plurality of gates 64a through 64c and a corresponding plurality of capacitors 66a through 66c to ground.

The outputs across capacitors 66a through 66c are applied to corresponding synchronous detectors 70a through 70c which are supplied with a reference input from oscillator 42 through a phase-shifting network 43 which provides a phase lag of 45°. The output of synchronous detectors 70a through 70c are applied to corresponding low-pass filters comprising series input resistors 72a through 72c and grounded shunting capacitors 74a through 74c. The outputs across capacitors 74a through 74c are coupled through respective gates 76a through 76c to the input of a buffer amplifier 78. The output of multivibrator 60 enables gates 64a and 76a and is applied to a 2 $\mu$s delay network 68b. The output of network 68b enables gates 64b and 76b and drives 2 us delay network 68c which enables gates 64c and 76c.

Buffer amplifier 78 provides an unambiguous but low-sensitivity output signal. The number of range-gated intervals for the low-sensitivity signal is shown as being half that for the high-sensitivity signal. However, in practice the number of low-sensitivity range-gated intervals may be as little as one-fifth to one-tenth the number of high-sensitivity intervals. For example, with 495 high-sensitivity intervals, there may be provided 99 low-sensitivity intervals. In such event, multivibrator 60 should provide an output pulse of 5 $\mu$s duration; and each of networks 68 should provide a time delay of 5 $\mu$s. For 99 low-sensitivity intervals, there are provided a corresponding number of gates 64, capacitors 66, synchronous detectors 70, low-pass filters 72–74, gates 76, and delay networks 68. The time-constant of resistor 62 and any one of the identical capacitors 66 may be such as to integrate over 1.6 pulses and hence 0.16 cycle of oscillator 42. If multivibrator 60 provides 2 us pulses, then the time-constant would be 3.2 $\mu$s. However, if multivibrator 60 provides pulses of 5 $\mu$s duration, then the time-constant would be 8 $\mu$s. Phase-shifting network 43 compensates for a corresponding phase lag in the comb filter comprising resistor 62 and capacitors 66, so that the two inputs to each of phase-sensitive synchronous detectors 70 will have a relative phase of either 0° or 180°. The low-pass filters 72–74 may each have a cut-off frequency of 32 Hz.

The output of buffer amplifier 58 is coupled to a differentiating circuit comprising series input resistor 80 and grounded shunt capacitor 81. The output of the differentiating circuit across resistor 81 is applied to an inverting amplifier 82, the output of which partially enables a +19° AND circuit 89 and a −19° AND circuit 90. The output of buffer amplifier 78 is applied to a positive input of each differential amplifiers 84 and 86. To the negative input of differential amplifier 84 is applied a positive voltage from source 83 which is scaled to represent +16° elevation angle of the low-sensitivity signal. To the negative input of differential amplifier 86 is applied a negative voltage from source 85 which is scaled to represent −16° elevation angle of the low-sensitivity signal. The output of buffer amplifier 78 is applied to a single-input flip-flop 88 which may comprise a Schmitt trigger circuit. The positive output of flip-flop 88 (which follows the polarity of its input) is applied to the other input of AND circuit 89; and the negative output of trigger circuit 88 (which is of a polarity opposite to its input) is applied to the other input of AND circuit 90.

The output of differential amplifier 84 is coupled to a differentiating circuit comprising series capacitor 95 and shunt resistor 96; and the output of differential amplifier 86 is applied to a differentiating circuit comprising series capacitor 92 and shunt resistor 93. The output across differentiating resistor 93 and the output of AND circuit 90 are connected to the inputs of an OR circuit 94, the output of which sets a bistable flip-flop 108.

The output of AND circuit 89 triggers a monostable multivibrator 91 which provides an output pulse of 3 us duration. The output of multivibrator 91 is applied to one input of OR circuit 100, to one input of AND circuit 98, and to a 500 $\mu$s delay network 97. The output of delay network 97 is applied to the other inputs of AND circuit 98 and OR circuit 100. The output of AND circuit 98 drives a monostable multivibrator 102 which provides an output pulse of 495 $\mu$s duration. The output of multivibrator 102 is applied to an inhibiting input of AND circuit 104 which receives another input from the output across differentiating resistor 96. The outputs of OR circuit 100 and AND circuit 104 are coupled to an OR circuit 106, the output of which resets flip-flop 108. The output of flip-flop 108 enables gate 110 to couple the output of buffer amplifier 58 to the vertical deflection input 112 of a display device.

In operation of our invention, the vertical spacing between horns 10 and 12 may be 1.54 wave-lengths of the pulses transmitted by magnetron 38. As shown in the aforementioned co-pending application, the output of phase detector 30 will exhibit abrupt discontinuities, or phase flips, at elevation angles of −19° and +19° relative to the bore sight. It is desired to provide at the vertical deflection input 112 of a display device signals representing the elevation angle of terrain within a center region extending from −19° to +19° and thus to exclude elevation angle signals received from a first region extending from −90° to −19° and from a third region extending from +19° to +90°. The central region is that for which the relative phase shift of radar return received by horns 10 and 12 is less than ±180°. For return received from an elevation angle of zero degrees which corresponds to the antenna bore sight, the relative phase shift is zero degrees.

Radar pulses from magnetron 38 are coupled through devices 14 and 16 and radiated from horns 10 and 12 to illuminate all terrain along a given azimuth. The antennas are oscillated or rotated in azimuth as will be appreciated by those skilled in the art. Radar return is received by horns 10 and 12 and coupled through devices 14 and 16, mixers 18 and 20, amplifiers 22 and 24, and limiters 26 and 28 to operate phase detector 30. Range gates 52 are sequentially actuated by delay networks 54, so that capacitors 50 store a profile of elevation angle versus range. If the nature of portions of terrain is such that no return is received, then limiters 26 and 28 will not be driven to saturation; and the resultant difference in their outputs causes amplifier 32 to disable gate 34, so that erroneous noise signals are not applied to comb filtering capacitors 50. The time-constant of resistor 48 in conjunction with capacitors 50 is sufficiently large to appreciably attenuate fluctuations in apparent elevation angle due to variations in magnetron frequency provided by oscillator 42.

Range-gated capacitors 66 also store a profile of elevation angle versus range. However, the time-constant of resistor 62 and capacitors 66 is sufficiently small to provide little attenuation of fluctuations in apparent elevation angle due to changes in magnetron frequency produced by oscillator 42. The cyclic variations in voltage across capacitors 66 are sensed by synchronous detectors 70 to provide corresponding direct-current voltages across filtering capacitors 74. As shown in the aforementioned co-pending application, the profile of the outputs of filtering capacitors 74 is a sine wave exhibiting a maximum negative value for an elevation angle of −90°, having a value of zero for an elevation angle of zero degrees, and exhibiting a maximum positive value at an elevation angle of +90°.

In the absence of reception of any phase flips of the high-sensitivity signal, the low-sensitivity signal operates to couple the high-sensitivity signal through gate 110 for elevation angles extending from −16° to +16°, thus partially truncating the center region of the high-sensitivity signal to insure that no ambiguous high-sensitivity signals received from the first and third regions are displayed. When the instantaneous center of radar return passes through an elevation angle of −16°, the output of differential amplifier 86 changes from negative to positive, thus providing a positive pulse across differentiating resistor 93 which is coupled through OR circuit 94 to set flip-flop 108. This enables gate 110 to pass subsequent high-sensitivity signals from buffer amplifier 58 to terminal 112. When the instantaneous center of radar return passes through +16° of elevation angle, the output of differential amplifier 84 changes from negative to positive, thus providing a positive pulse across differentiating resistor 96. In the absence of an output from monostable multivibrator 102, AND circuit 104 couples the pulse across resistor 96 through OR circuit 106 to re-set flip-flop 108 and thus terminate the coupling of the high-sensitivity signal to terminal 112.

If the nature of the terrain is such that the first phase flip at −19° elevation angle is present, then the high-sensitivity output signal of buffer amplifier 58 will abruptly change from positive to negative. The differentiating circuit 80–81 provides a negative pulse which is inverted by amplifier 82. Since at an elevation angle of −19° the low-sensitivity signal from buffer amplifier 78 is negative, the negative output of flip-flop 88 will be positive; and the positive pulse from inverting amplifier 82 will be coupled through AND circuit 90 and OR circuit 94 to set flip-flop 108 at −19° elevation angle in response to the first phase flip of the high-sensitivity signal. Accordingly, if the first phase flip at −19° is detected, then gate 110 is enabled at −19°, rather than at −16°; and the slight 3° truncation of the lower portion of he center region is removed.

If the nature of the terrain is such that the second phase flip at +19° elevation angle is received, then the output of buffer amplifier 58 will again abruptly change from positive to negative, thus providing a negative spike across differentiating resistor 81 which is inverted by amplifier 82. At an elevation angle of +19°, the positive output of flip-flop 88 is positive; and AND circuit 89 is enabled to couple the brief positive spike from inverting amplifier 82 to multivibrator 91. Upon receipt of the second phase flip from a first transmitted pulse, multivibrator 91 lengthens or stretches the brief spike to a duration of 3 us and couples it to delay network 97. If the second phase flip is again detected from a second transmitted pulse, then the recurring output from multivibrator 91 in combination with the delayed pulse from multivibrator 91 through network 97 will actuate AND circuit 98 to trigger multivibrator 102. Multivibrator 102 inhibits AND circuit 104 for nearly the full period between transmitted pulses. Accordingly, upon receipt of radar return from a third transmitted pulse, AND circuit 104 will be disabled when the center of radar return sweeps through +16° elevation angle; and the output pulse from differentiating resistor 96 will not be coupled through AND circuit 104 to re-set flip-flop 108. Instead, flip-flop 108 will be re-set either by the delayed second phase flip of the second transmitted pulse from network 97 which is coupled through OR circuits 100 and 106, or by the second phase flip from the third transmitted pulse coupled directly through OR circuits 100 and 106, whichever occurs first. It will be appreciated that the truncation at +16° of the center region of the high-sensitivity signal is removed; and the region is extended to its maximum limit of +19° if the second phase flip of the high-sensitivity signal is received for two consecutive pulses. If the second phase flip is detected for succeeding transmitted pulses, AND circuit 104 will be successively disabled, so that flip-flop 108 will be re-set, not by differential amplifier 84, but by the continued detection of the second phase flip. If for any transmitted pulse, the second phase flip is not detected, AND circuit 98 will not be enabled to trigger multivibrator 102. Flip-flop 108 will, however, be re-set at approximately +19° elevation angle by the delayed phase flip from network 97 of the previous transmitted pulse. For the next transmitted pulse, however, multivibrator 102 will not disable AND circuit 104; and the center region will again be truncated at +16° in response to differential amplifier 84. The pulse duration of multivibrator 102 is slightly less than the period between transmitted pulses to insure that it reverts to its normal state slightly before a triggering pulse is received from AND circuit 98 in the event the second phase flip is detected for two successive transmitted pulses.

It will be appreciated that we have accomplished the objects of our invention. We have provided an improved phase interferometer radar in which most of the central region of the high-sensitivity elevation angle versus range signal is tracked with but little truncation, without the necessity for utilizing phase flips of the high-sensitivity signal which may or may not occur at the end points of the central region. If the nature of the terrain is such that the first phase flip of the high-sensitivity signal is received, then the slight truncation at the lower end of the central region is immediately removed. If the nature of the terrain is such that the second phase flip of the high-sensitivity signal is received in response to at least two successively transmitted pulses, so that there is a good probability that the second phase flip will be detected in response to the next succeeding pulse, then the slight truncation at the upper end of the central region is removed for only the next succeeding transmitted pulse. If the second phase flip is detected for such next succeeding pulse, then the central region will continue to be extended until the second phase flip occurs. If the second phase flip is not detected for one of the succeeding transmitted pulses, then the slight truncation of the upper portion of the central region of the high-sensitivity signal is again imposed until the second phase flip is again sensed for at least two successive pulses.

It will be understood that certain features and sub-combinations are of utility and may be employed without reference to other features and subcombinations. It will be further understood that various changes may be made in detail without departing from the spirit of our invention.

Having thus described our invention, what we claim is:

1. A phase interferometer radar system including in combination means for periodically transmitting radar pulses, means including a pair of spaced elements for receiving reflected pulses, means for determining the relative phase shift between pulses received by said elements, means responsive to the determining means for providing a first signal, means including an alternating-current source for cyclically varying the frequency of pulses transmitted, means including a plurality of synchronous detectors responsive to the determining means and to the source for providing a second signal, a first and a second amplitude discriminating circuit, means coupling the second signal to the first and second circuits, a gate, means coupling the first signal to the gate, means responsive to the first circuit for enabling the gate, and means responsive to the second circuit for disabling the gate.

2. A system as in claim 1 which further includes a polarity sensing circuit, means coupling the second signal to the sensing circuit, means responsive to the first signal for detecting abrupt reversals in polarity thereof, means responsive to the sensing circuit and to the reversal means for providing a third signal, and means responsive to the third signal for controlling the gate.

3. A system as in claim 1 which further includes means responsive to the first and second signals for providing a third signal, and means responsive to the third signal for enabling the gate.

4. A system as in claim 1 which further includes means responsive to the first and second signals for providing a third signal, means for time delaying the third signal, means responsive to the delay means and to the third signal for preventing the second circuit from disabling the gate, and means responsive to the delay means for disabling the gate.

5. A system as in claim 4 which further includes means responsive to the third signal for disabling the gate.

6. A system as in claim 4 which further includes means responsive to the first and second signals for providing a fourth signal and means responsive to the fourth signal for enabling the gate.

7. A system as in claim 4 wherein the construction of the delay means is such as to provide a time delay substantially equal to the period between transmitted pulses.

8. A system as in claim 4 in which the preventing means includes means for providing an inhibiting pulse having a duration somewhat less than the period between transmitted pulses.

9. A system as in claim 4 wherein the means providing the third signal includes a pulse-stretching circuit.

10. A system as in claim 1 wherein the means providing the first signal includes a range-gated comb filter.

11. A system as in claim 1 wherein the means providing the second signal comprises a range-gated comb filter responsive to the determining means and means coupling the comb filter to the synchronous detectors.

12. A system as in claim 1 wherein the first signal means includes a comb filter range-gated at time increments t and wherein the second signal means includes a comb filter range-gated at time increments T, where $T/t$ is an integer not less than two.

13. A system as in claim 1 wherein the first signal means includes a comb filter having a time-constant sufficiently great to provide appreciable attenuation of frequencies equal to and greater than that of the alternating-current source.

14. A system as in claim 1 wherein the second signal means includes a comb filter having a time-constant sufficiently small to provide relatively low attenuation of frequencies equal to and less than that of the alternating-current source.

15. A system as in claim 1 wherein the second signal means includes a plurality of low-pass filters responsive to the synchronous detectors and having cut-off frequencies appreciably less than the frequency of the alternating-current source.

16. A system as in claim 1 wherein the means providing the second signal includes means comprising a phase lag circuit for coupling the source to the synchronous detectors.

17. A phase interferometer radar system including in combination means for transmitting radar pulses, means including a pair of spaced elements for receiving reflected pulses, means for determining the relative phase shift between pulses received by said elements, a first plurality of gates, means including a resistor for coupling the determining means to each of the first gates, a plurality of capacitors, means coupling each of the first gates to a corresponding capacitor, means including an alternating-current source for cyclically varying the frequency of pulses transmitted, a plurality of synchronous detectors, means coupling the source to each detector, means coupling each capacitor to a corresponding detector, a plurality of low-pass filters, means coupling each detector to a corresponding filter, a second plurality of gates, means coupling each filter to a corresponding one of the second gates, means for sequentially actuating the first gates, and means for actuating each of the second gates in synchronism with a corresponding one of the first gates.

* * * * *